(12) United States Patent
Benhase et al.

(10) Patent No.: US 8,627,011 B2
(45) Date of Patent: *Jan. 7, 2014

(54) MANAGING METADATA FOR DATA IN A COPY RELATIONSHIP

(71) Applicant: International Business Machines Corporation, Armonk, NY (US)

(72) Inventors: Michael T. Benhase, Tucson, AZ (US); Theresa M. Brown, Tucson, AZ (US); Lokesh M. Gupta, Tucson, AZ (US); Suguang Li, Tucson, AZ (US); Mark L. Lipets, Tucson, AZ (US); Carol S. Mellgren, Tucson, AZ (US); Kenneth W. Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/756,333

(22) Filed: Jan. 31, 2013

(65) Prior Publication Data

US 2013/0145100 A1 Jun. 6, 2013

Related U.S. Application Data

(63) Continuation of application No. 13/077,840, filed on Mar. 31, 2011.

(51) Int. Cl.
G06F 12/00 (2006.01)
G06F 13/00 (2006.01)
G06F 13/28 (2006.01)

(52) U.S. Cl.
USPC ............................................ 711/133

(58) Field of Classification Search
USPC ............................................ 711/133
See application file for complete search history.

(56) References Cited

U.S. PATENT DOCUMENTS 7,124,128 B2 * 10/2006 Springer et al. ..................... 1/1
7,472,312 B2 12/2008 Jarvis et al.
(Continued)

OTHER PUBLICATIONS

L F. Cabrera, et al., "QuickSilver Distributed File Services: An Architecture for Horizontal Growth", IEEE, 1988, pp. 1-15.

(Continued)

Primary Examiner — Matthew Bradley
Assistant Examiner — Craig Goldschmidt
(74) Attorney, Agent, or Firm — David W. Victor; Konrad Raynes Davda & Victor LLP

(57) ABSTRACT

Provided is a method for managing metadata for data in a copy relationship copied from a source storage to a target storage. Information is maintained on a copy relationship of source data in the source storage and target data in the target storage. The source data is copied from the source storage to the cache to copy to target data in the target storage indicated in the copy relationship. Target metadata is generated for the target data comprising the source data copied to the cache. An access request to requested target data comprising the target data in the cache is processed and access is provided to the requested target data in the cache. The target metadata for the requested target data in the target storage is discarded in response to determining that the requested target data in the cache has not been destaged to the target storage.

24 Claims, 6 Drawing Sheets

(56) References Cited

U.S. PATENT DOCUMENTS

| | | | |
|---|---|---|---|
| 7,529,776 | B2 | 5/2009 | Li et al. |
| 7,546,412 | B2 * | 6/2009 | Ahmad et al. ............... 711/112 |
| 7,734,580 | B2 | 6/2010 | Lahiri et al. |
| 7,873,878 | B2 | 1/2011 | Belluomini et al. |
| 2004/0260735 | A1 * | 12/2004 | Martinez et al. ............. 707/204 |
| 2006/0106971 | A1 | 5/2006 | Mahar et al. |
| 2009/0183145 | A1 | 7/2009 | Hu et al. |
| 2009/0300298 | A1 * | 12/2009 | Ash et al. ..................... 711/156 |
| 2010/0191925 | A1 | 7/2010 | Blount et al. |
| 2012/0254547 | A1 | 10/2012 | Benhase et al. |

OTHER PUBLICATIONS

"Expanding Track State Possibilities of Global Metedata Tracks to Improve Access", IP.com, No. IPCOM000124563D, Apr. 28, 2005, pp. 1-2.

B. Dufrasne, et al., "IMB System Storage DS8800 Architecture and Implementation", IBM Corporation, Jan. 2011, IBM document No. SG24-8886-00, pp. 1-434.

Preliminary Amendment filed Jan. 31, 2012, pp. 7, for U.S. Appl. No. 13/077,840, filed Mar. 31, 2011 by inventors M.T. Benhase, et al.

NOA dated Aug. 6, 2013, pp. 20, for U.S. Appl. No. 13/077,840, filed Mar. 31, 2011 by inventors M.T. Benhase, et al.

* cited by examiner

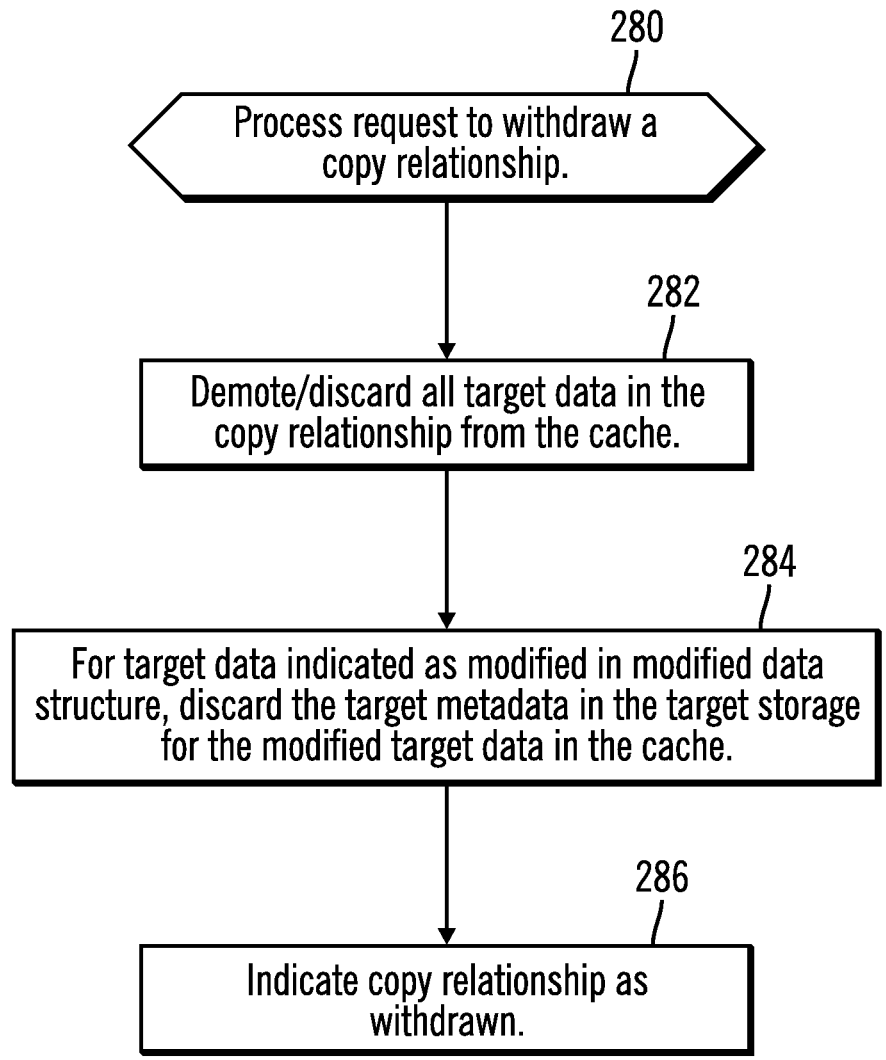

MANAGING METADATA FOR DATA IN A COPY RELATIONSHIP

RELATED APPLICATIONS

This patent application is a continuation of U.S. patent application Ser. No. 13/077,840, filed on Mar. 31, 2011, which patent application is incorporated herein by reference in its entirety.

BACKGROUND OF THE INVENTION

1. Field of the Invention

The present invention relates to a computer program product, system, and method for managing metadata for data in a copy relationship.

2. Description of the Related Art

In a storage environment, source volumes may be mirrored to target volumes to provide redundant copies of data. The source and target volumes may be in different storage devices to provide further redundancy. A point-in-time copy replicates data in a manner that appears instantaneous and allows a host to continue accessing the source volume while actual data transfers to the copy volume are deferred to a later time. The point-in-time copy appears instantaneous because complete is returned to the copy operation in response to generating the relationship data structures without copying the data. The point-in-time copy relationships that are immediately established in response to the point-in-time copy command include a bitmap or other data structure indicating the location of blocks in the volume at either the source volume or the copy volume.

Point-in-time copy techniques, such as the IBM Flash-Copy® (FlashCopy is a registered trademark of International Business Machines, Corp. or "IBM"), typically defer the transfer of the source volume tracks in the copy relationship to the corresponding target volume until a write operation is requested to that data block on the source volume. Data transfers may also proceed as a background copy process with minimal impact on system performance. Further, a source track in the copy relationship may be copied to the corresponding target track in the copy relationship in response to a read request to the corresponding target track.

A command to withdraw the copy relationship may be submitted. To implement a copy relationship withdraw operation, the target metadata for all the target volume tracks in the copy relationship is discarded in the target storage system and any target tracks in the copy relationship, modified or unmodified, residing in cache, are demoted, i.e., discarded. As part of the copy relationship withdraw operation, access to the target volume is quiesced until all the metadata for the target volume in the target storage is discarded. Following the withdraw operation, the target metadata for a requested target track needs to be rebuilt when the target track is subsequently requested because all the metadata for the target volume in the target storage was discarded during the copy relationship withdraw operation.

The target metadata for the target volume is discarded to prevent a mismatch of the target metadata data in the target storage and the target tracks described by the metadata. This mismatch may occur if at the time of the withdraw operation, target metadata for modified target tracks in cache is destaged to the target storage before the modified target tracks. For this reason, during the copy withdraw operation, all target metadata in the volume is discarded to avoid this mismatch of the target storage having target metadata having information that is inconsistent with the corresponding target tracks in the target storage.

There is a need in the art for improved techniques for managing metadata in the storage system and cache.

SUMMARY

Provided is a method for managing metadata for data in a copy relationship copied from a source storage to a target storage. Information is maintained on a copy relationship of source data in the source storage and target data in the target storage. The source data is copied from the source storage to the cache to copy to target data in the target storage indicated in the copy relationship. Target metadata is generated for the target data comprising the source data copied to the cache. An access request to requested target data comprising the target data in the cache is processed and access is provided to the requested target data in the cache. A determination is made as to whether the requested target data in the cache has been destaged to the target storage. The target metadata for the requested target data in the target storage is discarded in response to determining that the requested target data in the cache has not been destaged to the target storage.

BRIEF DESCRIPTION OF THE DRAWINGS

FIG. 8 illustrates an embodiment of operations performed to process a request to withdraw a copy relationship.

DETAILED DESCRIPTION

Figure 1:
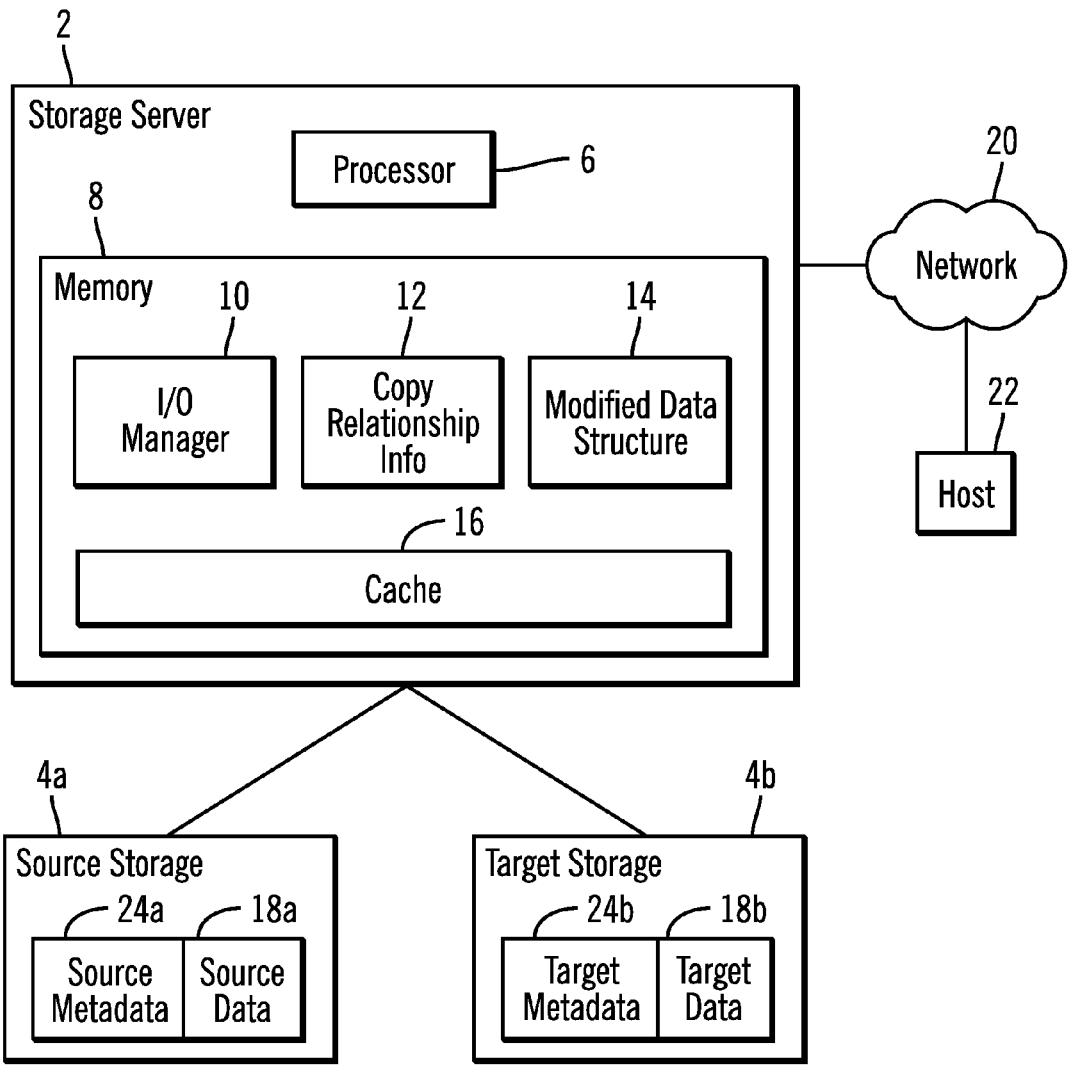
FIG. 1 illustrates an embodiment a computing environment.

FIG. 1 illustrates an embodiment of a storage server 2 coupled to a source storage 4a and a target storage 4b. The storage server 2 includes a processor 6 and a memory 8 having an Input/Output (I/O) manager 10, copy relationship information 12, a modified data structure 14, and a cache 16. The copy relationship information 12 provides a relationship information for each instance of a copy operation to copy source data 18a in the source storage 4a to target data 18b in the target storage 4b. The target and source data 18a, 18b specified for the copy relationships 12 may comprise tracks, logical block addresses (LBAs), volumes, or any other units of data known in the art. The I/O manager 10 manages the copying of source data 18a to target data 18b as part of a copy relationship 12, and manages I/O access to the target storage 4b from a host 22, connected to the server over network 20. The source 4a and target 4b storages may further maintain source metadata 24a and target metadata 24b, respectively, providing metadata for the source 18a and target 18b data. Metadata includes information describing the contents of the source and target data for which the metadata is provided, such as a format of the data, number of records, record size, content of the data, etc. One unit of metadata 24a, 24b may provide information for multiple units of source 18a and target data 18b, such as for units of tracks, blocks, etc. The source 18a and target data 18b may comprise customer data.

The source data 18a and metadata 24a and target data 18b and metadata 24b may be maintained in the source 4a and target 4b storages, respectively, and also in the cache 16. In the cache 16, the data 18a, 18b and metadata 20a, 20b may be modified and then subsequently destaged to the storages 4a, 4b for persistent storage.

The storage server 2 may receive read and write requests directed to the target storage 4b from a host 20 over a network 22. The modified data structure 14 indicates target data in the cache 16 that has been modified and needs to be destaged to the target storage 4b. The modified target data 18b in the cache may comprise updates from the host 22 to the target data 18b or source data 18a copies to the target data 18b transferred to the cache 16 as part of a background copy operation for the copy relationship 12.

The storages 4a, 4b may comprise storage media implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, etc. The memory 8 and cache 16 may be comprised of one or more volatile or non-volatile memory devices known in the art.

In FIG. 1, the I/O manager 10 is shown as a software program in the memory 8 executed by the processor 6. In an alternative embodiment, the I/O manager 10 may be implemented in a hardware component, such as dedicated integrated circuit, e.g., Application Specific Integrated Circuit (ASIC), expansion card, etc., in the storage server 100 or implemented as a combination of hardware or software.

The network 22 may comprise a Wide Area Network (WAN), Local Area Network (LAN), Storage Area Network (SAN), wireless network, the Internet, an Intranet, peer-to-peer network, etc. The storage server 2 may connect to the storages 4a and 4b with a direct connection or cable, over the Internet or through multiple switches and cables in a WAN, SAN, LAN, etc.

Figure 2:
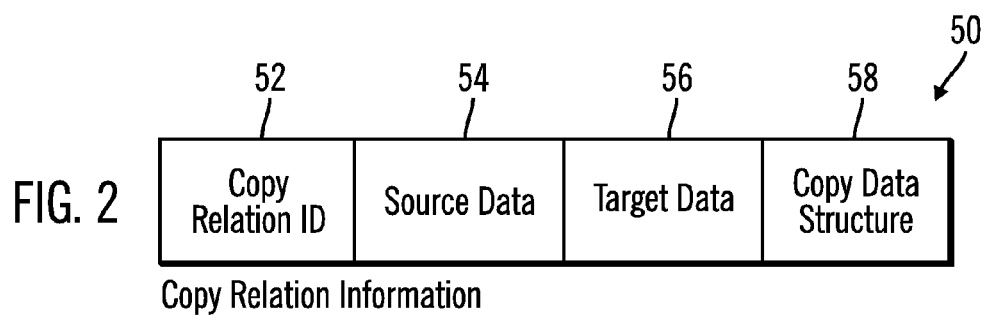
FIG. 2 illustrates an embodiment of copy relation information.

FIG. 2 illustrates an embodiment of an instance of copy relationship information 50 maintained in the copy relationships 12 for one copy relationship including a copy relationship identifier (ID) 52 identifying a relation of source data 54, such as a volume or group of tracks or blocks, to copy to target data 56, and a copy data structure 58 indicating portions of the source data 54, such as tracks, blocks, extents, copied to the target data 56 in the copy relationship 50. The copy relationship 50 may indicate specific source data units 54 and corresponding target data units 56 to which the source data units are copied.

The copy relationship 50 may represent a logical or virtual copy operation, such as FlashClopy, where the initial copy operation is completed instantaneously upon creating the copy relationship 50 data structures, and the source data 54 may be copied in the background over to the target data 56 as part of background copy processes that seek to minimize impact on the server 2 resources and performance.

Figure 3:
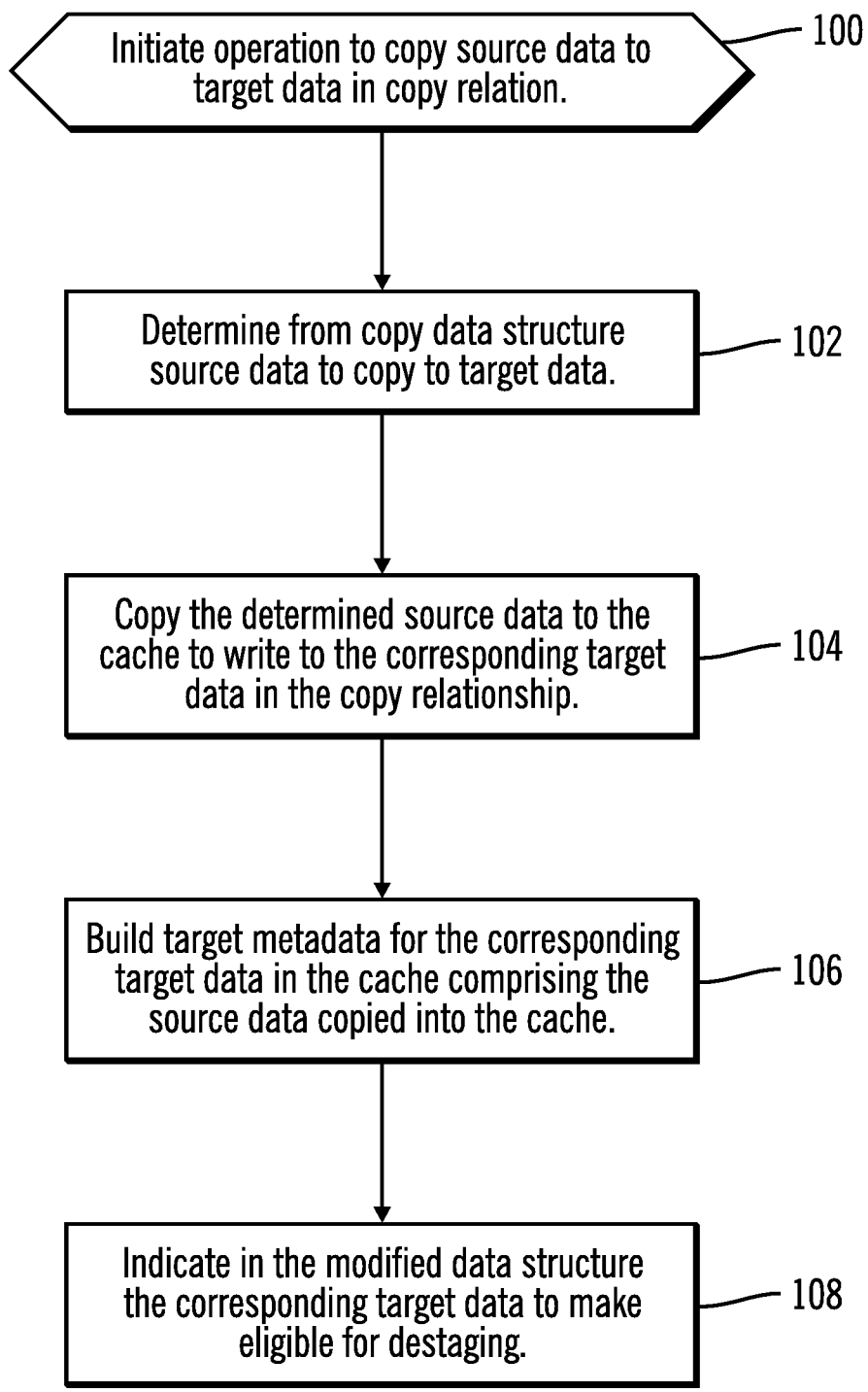
FIG. 3 illustrates an embodiment of operations to copy source data to target data in a copy relationship.

FIG. 3 illustrates an embodiment of operations performed by the I/O manager 10 to initiate an operation to copy the source data 54 in a copy relationship 50 to the corresponding target data 56. Upon initiating (at block 100) the operation to copy the source data 54 to the target data 56, the I/O manager 10 determines (at block 102) from the copy data structure 12 source data to copy to target data, such as sectors, tracks, blocks, etc. The I/O manager 10 then copies (at block 104) the determined source data 54 to the cache 16 to write to the corresponding target data 56 in the copy relationship 50. The I/O manager 10 builds (at block 106) target metadata 24b for the corresponding target data in the cache 16 comprising the source data 54 copied into the cache 16. The built target metadata 24b may include metadata for the target data 18b subject to the specific operation and additional units of target data, such as tracks, blocks, sectors, etc. The I/O manager 10 indicates (at block 108) in the modified data structure 14 the corresponding target data 56 in the cache 16 updated from the source data 54 to make eligible for destaging to the target storage 4b as part of a subsequent destage process.

Figure 4:
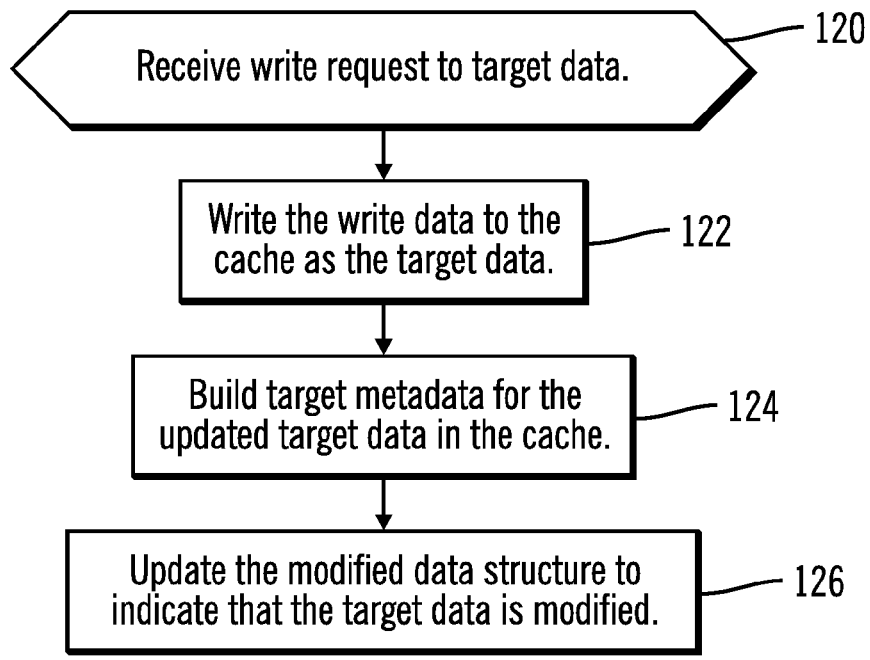
FIG. 4 illustrates an embodiment of operations to process a write request to target data.

FIG. 4 illustrates an embodiment of operations performed by the I/O manager 10 to process a write request from the host 22. Upon receiving (at block 120) a write request having write data to write to target data 18b, the I/O manager 10 writes (at block 122) the write data to the cache 16 as target data 18b and builds (at block 124) target metadata 24b for the updated target data 18b in the cache 16. The I/O manager 10 further updates (at block 126) the modified data structure 14 to indicate that the target data 18b in the cache 16 is modified so that the modified target data and its built metadata 24b are eligible for destaging as part of a subsequent destage operation.

Figure 5:
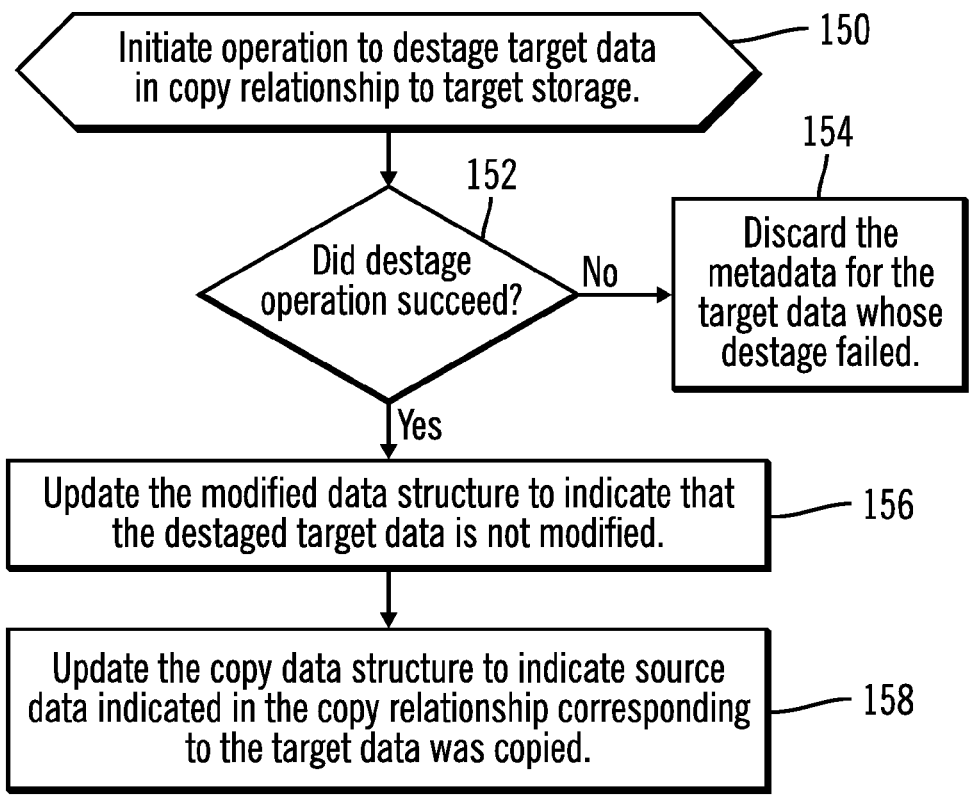
FIG. 5 illustrates an embodiment of operations to destage target data in a copy relationship to target storage.

FIG. 5 illustrates an embodiment of operations performed by the I/O manager 10 to destage target data 18b in the cache 16 in a copy relationship 50 to the target storage 4b. Upon initiating (at block 150) the destage operation, if (at block 152) the destage operation succeeded, then the I/O manager 10 updates (at block 156) the modified data structure 14 to indicate that the destaged target data is not modified and updates (at block 158) the copy data structure 12 to indicate the corresponding source data 54 in the copy relationship 50 has been copied or mirrored to the corresponding target data 56. Once the target data 18b has been modified with more current data, then even if the corresponding source data 54 was not previously copied over, there is no need to copy over since the target data 56 has been updated. If (at block 152) the destage did not complete, then the I/O manager 10 discards (at block 154) the target metadata 24b for the target data 18b whose destage failed. This discarding of the target metadata 24b for the failed destage will prevent a situation from occurring where the rebuilt target metadata 24b is destaged, but the corresponding target data 18b is not destaged, and is prevented from being destaged due to a copy relationship withdrawal operation which demotes the target data 18b in the cache 16 while leaving the target metadata 24b for the demoted target data 18b not destaged in the target storage 4b.

Figure 6:
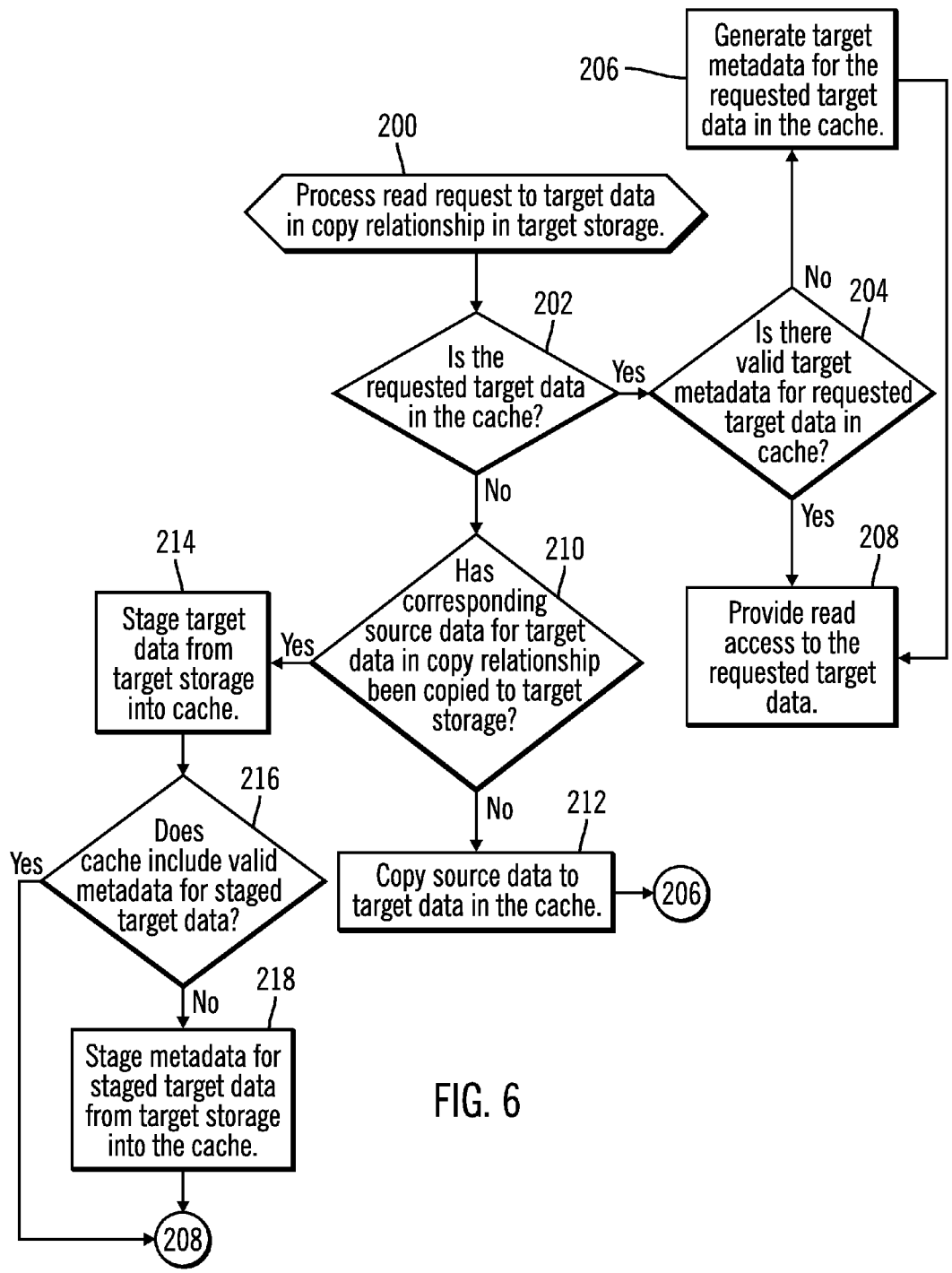
FIG. 6 illustrates an embodiment of operations to process a read request to target data in a copy relationship.

FIG. 6 illustrates an embodiment of operations performed by the I/O manager 10 to process (at block 200) a read request to target data 56 in a copy relationship 50 in the target storage 4b. If (at block 202) the requested target data 18b is in the cache 16 and if (at block 204) there is valid target metadata 24b for the requested target data 56 in the cache 16, then the I/O manager 10 provides (at block 208) read access to the requested target data 18b and its metadata 24b in the cache 16. If (at block 202) there is not valid target metadata 24b for the requested target data 18b in the cache 16, then the I/O manager 10 generates (at block 206) target metadata 24b for the requested target data 18b in the cache 16 and control then proceeds to block 208 to provide read access to the target data 18b and its metadata 24b.

If (at block 202) the requested target data 18b is not in the cache 16 and if (at block 210) the copy data structure 58 indicates that the corresponding source data 54 for the requested target data 18b or 56 in the copy relationship 50 has not been copied to the target storage 4b, then the I/O manager 10 copies (at block 212) the corresponding source data to the requested target data 18b in the cache 16. Control then proceeds to block 206 to build target metadata 24b and provide read access to the requested target data 18b in the cache 16. If (at block 210) the copy data structure 58 indicates that the corresponding source data 54 for the requested target data 18b, 56 in the copy relationship 50 has already been copied to the target storage 4b, then the I/O manager 10 stages (at block 214) the requested target data from the target storage 4b into the cache 16. If (at block 216) the cache 16 already includes valid metadata 24b for the staged target data 18b, then read access is provided (at block 208) to the target data 18b in the cache 16. If (at block 216) the cache 16 does not include the requested target data, then the I/O manager stages (at block 218) the target metadata 24b for the requested target data 18b from the target storage 4b to the cache 16 and control proceeds to block 208 to provide read access to the requested target data 18b and its metadata 24b in the cache 16.

Figure 7:
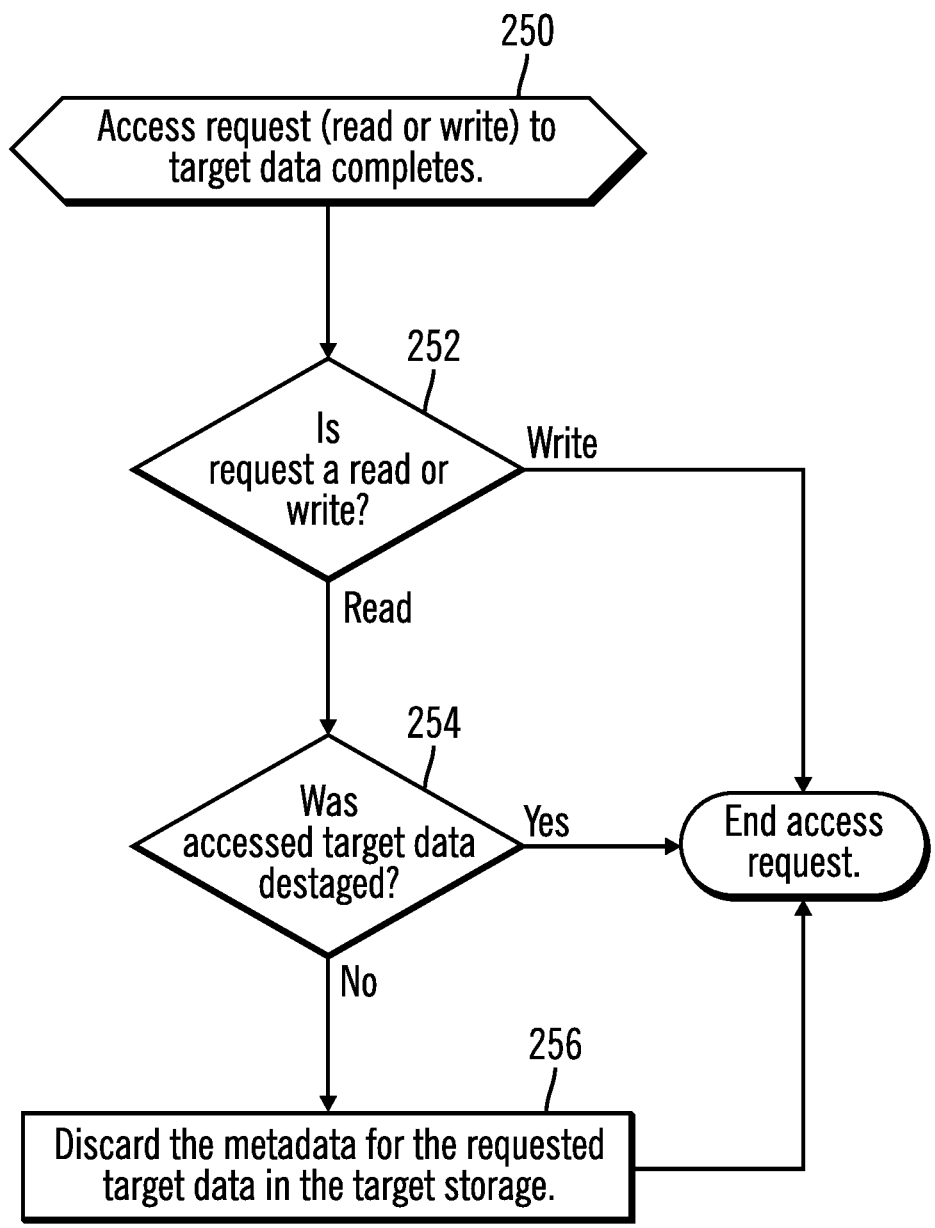
FIG. 7 illustrates an embodiment of operations performed when an access request to target data completes.

FIG. 7 illustrates an embodiment of operations performed by the I/O manager 10 to process metadata 24b for accessed target data 18b in the cache 18 after the access operation ends. Upon the access ending (at block 250), but before the access completes, if (at block 252) the access is a write, then the access request is ended, such as with an acknowledgment to the host 22 of write complete. If (at block 252) the access is a read, then the I/O manager 10 determines (at block 254) whether the accessed target data 18b was destaged. If so, then control ends, leaving the target metadata 24b for the accessed target data 18b in the cache 16. If (at block 254) the accessed target data was not destaged, then the I/O manager discards (at block 256) the target metadata 24b for the requested target data in the target storage 4b. This discarding of the target metadata 24b prevents a mismatch if the target metadata 24b is destaged but the corresponding target data 18b cannot be destaged before the withdrawal of the copy relationship.

FIG. 8 illustrates an embodiment of operations performed by the I/O manager 10 to process a request to withdraw a copy relationship. Upon receiving (at block 280) a request to withdraw a copy relationship 50, the I/O manager demotes, i.e., discards, (at block 282) all the target data 18b in the cache 16 for the copy relationship 50 being withdrawn. For target data 18b indicated as modified in the cache 16 in the modified data structure 14, the I/O manager 10 discards (at block 284) the target metadata in the target storage 4b for the demoted/discarded modified target data 56 in the cache 16. The copy relationship 50 is then indicated as withdrawn (at block 286), which would also end any background copy operation of the source data 54 to the corresponding target data 56 in the target storage 4b.

With the embodiment of FIG. 8, the target metadata 24b in the target storage 4b is discarded in the event that the target metadata 24b was destaged to the target storage 4b before the target data in the cache 16 was discarded. If this operation was not performed, then the target metadata 24b destaged to the target storage 4b may not reflect the target data 18b in the target storage 4b, but instead reflect the discarded target data 18b in the cache 16. Thus, discarding the target metadata in the target storage 4b prevents this mismatch of target metadata 24b and target data 18b in the storage 4b.

Described embodiments provide techniques for managing target metadata in the cache so as to limit the amount of target metadata that needs to be discarded if the copy relationship is withdrawn by discarding target metadata for requested target data in the cache that has not been destaged. In this way, the amount of target metadata that needs to be discarded at the time of the copy withdrawal operation is reduced to avoid delays that could adversely affect server performance because I/O activity to target storage data may be queisced during the time required to discard the target metadata as part of the copy withdrawal operation.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The variables "a" and "b" when used to represent a variable number of an element may indicate any number of instances of the element, and may indicate different integer numbers when used with different elements or when used with different instances of the same element. For instance variables "a" and "b" used to indicate a number of a source storage and target storage may indicate the same or different number of these elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3-8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
maintaining information on a copy relationship of source data in a source storage and target data in a target storage;
copying source data from the source storage to a cache to copy to target data in the target storage indicated in the copy relationship;
generating target metadata for the target data comprising the source data copied to the cache;
processing an access request to requested target data comprising the target data in the cache;
providing access to the requested target data in the cache;
determining whether the requested target data in the cache has been destaged to the target storage; and
discarding the target metadata for the requested target data in the target storage in response to determining that the requested target data in the cache has not been destaged to the target storage.

2. The method of claim 1, wherein the determining whether the requested target data in the cache has been destaged and discarding the target metadata are performed after the access request is processed.

3. The method of claim 1, wherein the request comprises a read request.

4. The method of claim 3, further comprising:
receiving a subsequent read request to the requested target data after completing the processed read request;
rebuilding target metadata for the requested target data for the subsequent read request;
providing access to the requested target data in the cache for the subsequent read request;
determining whether the requested target data in the cache has been destaged to the target storage; and
discarding the rebuilt target metadata for the requested target data in the target storage in response to determining that the requested target data in the cache has not been destaged to the target storage.

5. The method of claim 1, wherein the request comprises a read request, further comprising:
retaining the target metadata for the requested target data in the cache to destage to the target storage in response to determining that the requested target data has been destaged to the target storage.

6. The method of claim 1, wherein the request comprises a read request, further comprising:
receiving a request to withdraw the copy relationship; and
demoting the target data in the cache in the copy relationship in response to receiving the request to withdraw the copy relationship.

7. The method of claim 1, wherein the request comprises a read request, further comprising:
receiving a write request to write data to the target data in the copy relationship;
updating the target data in the cache with the write data;
generating target metadata for the updated target data in the cache; and
indicating in a data structure the updated target data in the cache, wherein the indication is removed in response to destaging the updated target data and the metadata for the updated target data to the target storage.

8. The method of claim 7, wherein the operations further comprise:
receiving a request to withdraw the copy relationship;
demoting the target data in the cache indicated in the copy relationship in response to receiving the request to withdraw the copy relationship; and
discarding the target metadata data in the target storage for the target data indicated in the data structure.

9. The method of claim 1, wherein the operations further comprise:
determining that an attempt to destage the target data to the target storage has failed; and
discarding the target metadata in the target storage for the target data whose destage failed in response to determining that the destage of the target data failed.

10. A computer program product for managing data being copied from a source storage to a target storage, the computer program product comprising a non-transitory computer readable storage medium having computer readable program code embodied therein that executes to communicate with the source storage, the target storage and a cache and to perform operations, the operations comprising:
maintaining information on a copy relationship of source data in the source storage and target data in the target storage;
copying source data from the source storage to the cache to copy to target data in the target storage indicated in the copy relationship;
generating target metadata for the target data comprising the source data copied to the cache;
processing an access request to requested target data comprising the target data in the cache;
providing access to the requested target data in the cache;
determining whether the requested target data in the cache has been destaged to the target storage; and
discarding the target metadata for the requested target data in the target storage in response to determining that the requested target data in the cache has not been destaged to the target storage.

11. The computer program product of claim 10, wherein the operations of determining whether the requested target data in the cache has been destaged and discarding the target metadata are performed after the access request is processed.

12. The computer program product of claim 10, wherein the request comprises a read request.

13. The computer program product of claim 12, wherein the operations further comprise:
receiving a subsequent read request to the requested target data after completing the processed read request;
rebuilding target metadata for the requested target data for the subsequent read request;
providing access to the requested target data in the cache for the subsequent read request;
determining whether the requested target data in the cache has been destaged to the target storage; and
discarding the rebuilt target metadata for the requested target data in the target storage in response to determining that the requested target data in the cache has not been destaged to the target storage.

14. The computer program product of claim 12, wherein the operations further comprise:
retaining the target metadata for the requested target data in the cache to destage to the target storage in response to determining that the requested target data has been destaged to the target storage.

15. The computer program product of claim 12, wherein the operations further comprise:
receiving a request to withdraw the copy relationship; and
demoting the target data in the cache in the copy relationship in response to receiving the request to withdraw the copy relationship.

16. The computer program product of claim 12, wherein the operations further comprise:
receiving a write request to write data to the target data in the copy relationship;
updating the target data in the cache with the write data;
generating target metadata for the updated target data in the cache; and
indicating in a data structure the updated target data in the cache, wherein the indication is removed in response to destaging the updated target data and the metadata for the updated target data to the target storage.

17. The computer program product of claim 16, wherein the operations further comprise:
receiving a request to withdraw the copy relationship;
demoting the target data in the cache indicated in the copy relationship in response to receiving the request to withdraw the copy relationship; and
discarding the target metadata data in the target storage for the target data indicated in the data structure.

18. The computer program product of claim 10, wherein the operations further comprise:
determining that an attempt to destage the target data to the target storage has failed; and discarding the target metadata in the target storage for the target data whose destage failed in response to determining that the destage of the target data failed.

19. A system in communication with a source storage and a target storage, comprising:
   a processor including at least one hardware component;
   a cache;
   a computer readable storage medium having computer readable program code embodied therein executed by the processor to perform operations, the operations comprising:
      maintaining information on a copy relationship of source data in the source storage and target data in the target storage;
      copying source data from the source storage to the cache to copy to target data in the target storage indicated in the copy relationship;
      generating target metadata for the target data comprising the source data copied to the cache;
      processing an access request to requested target data comprising the target data in the cache;
      providing access to the requested target data in the cache;
      determining whether the requested target data in the cache has been destaged to the target storage; and
      discarding the target metadata for the requested target data in the target storage in response to determining that the requested target data in the cache has not been destaged to the target storage.

20. The system of claim 19, wherein the operations of determining whether the requested target data in the cache has been destaged and discarding the target metadata are performed after the access request is processed.

21. The system of claim 19, wherein the request comprises a read request, wherein the operations further comprise:
   receiving a subsequent read request to the requested target data after completing the processed read request;
   rebuilding target metadata for the requested target data for the subsequent read request;
   providing access to the requested target data in the cache for the subsequent read request;
   determining whether the requested target data in the cache has been destaged to the target storage; and
   discarding the rebuilt target metadata for the requested target data in the target storage in response to determining that the requested target data in the cache has not been destaged to the target storage.

22. The system of claim 19, wherein the request comprises a read request, wherein the operations further comprise:
   retaining the target metadata for the requested target data in the cache to destage to the target storage in response to determining that the requested target data has been destaged to the target storage.

23. The system of claim 19, wherein the request comprises a read request, wherein the operations further comprise:
   receiving a request to withdraw the copy relationship; and
   demoting the target data in the cache in the copy relationship in response to receiving the request to withdraw the copy relationship.

24. The system of claim 19, wherein the request comprises a read request, wherein the operations further comprise:
   receiving a write request to write data to the target data in the copy relationship;
   updating the target data in the cache with the write data;
   generating target metadata for the updated target data in the cache; and
   indicating in a data structure the updated target data in the cache, wherein the indication is removed in response to destaging the updated target data and the metadata for the updated target data to the target storage.

* * * * *